Feb. 10, 1953 A. A. LOMBARD 2,628,067
GAS TURBINE AND LIKE ENGINE
Filed June 16, 1947 2 SHEETS—SHEET 1

Inventor
Adrian A. Lombard
by Wilkinson & Mawhinney
Attorneys

Feb. 10, 1953  A. A. LOMBARD  2,628,067
GAS TURBINE AND LIKE ENGINE
Filed June 16, 1947  2 SHEETS—SHEET 2

Inventor
Adrian A. Lombard
by Wilkinson & Mawhinney
Attorneys

Patented Feb. 10, 1953

2,628,067

UNITED STATES PATENT OFFICE 2,628,067

GAS TURBINE AND LIKE ENGINE

Adrian Albert Lombard, Clitheroe, England, assignor to Rolls-Royce Limited, Derby, England, a British company Application June 16, 1947, Serial No. 754,945
In Great Britain June 18, 1946

2 Claims. (Cl. 253—65)

This invention relates to gas-turbines and the like engines in which high temperatures are developed, and has for its object to provide a construction and arrangement whereby the main structural elements of the engine are adequately isolated from high temperatures.

According to this invention there is provided in an axial flow turbine, an outer load-carrying or strength-ring secured to the main engine-structure and surrounding the turbine stationary shroud-ring for the rotor blades to provide a space therebetween serving to insulate the load-carrying ring from the hot gases.

According to another feature of the invention the exhaust structure is carried on the said load-carrying ring whereby loads on the exhaust structure are transmitted through the said ring to the main engine-structure. The said ring further may provide a point of support for the engine in its supporting structure.

According to another feature of the invention the inner stationary shroud-ring is retained in the load-carrying ring by loose spigots, and in a preferred construction the said shroud-ring is constructed in separate segments.

According to another feature of the invention the outer load-carrying ring aforesaid may be sandwiched between two rings provided each with a flange at its inner end whereon the inner segmental ring is spigoted. The use of these two separate rings further reduces the heat conductivity to the strength-element.

The space provided by this invention inside the load-carrying ring may be an enclosure for stagnant gas, or means may be provided for supplying a flow of cooling air to it.

According to another feature of the invention the outlet passage from the turbine-wheel, where the temperature of the gases is still high, is constituted by an inner skin to provide an air-space between it and the outer skin which is secured through the load-carrying ring to the main structure of the turbine, thereby providing an insulating air-space between the hot gases and the outer casing; the said inner skin is conveniently in the form of a truncated cone welded at its end remote from the turbine-wheel to the exhaust-passage for the hot gases.

Figure 1:
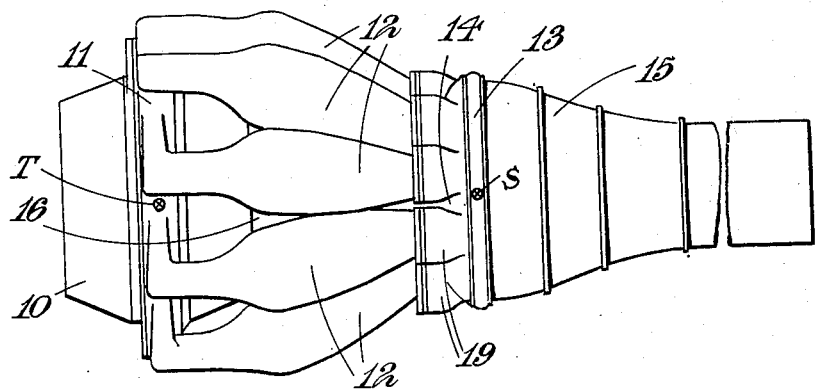
Figure 2:
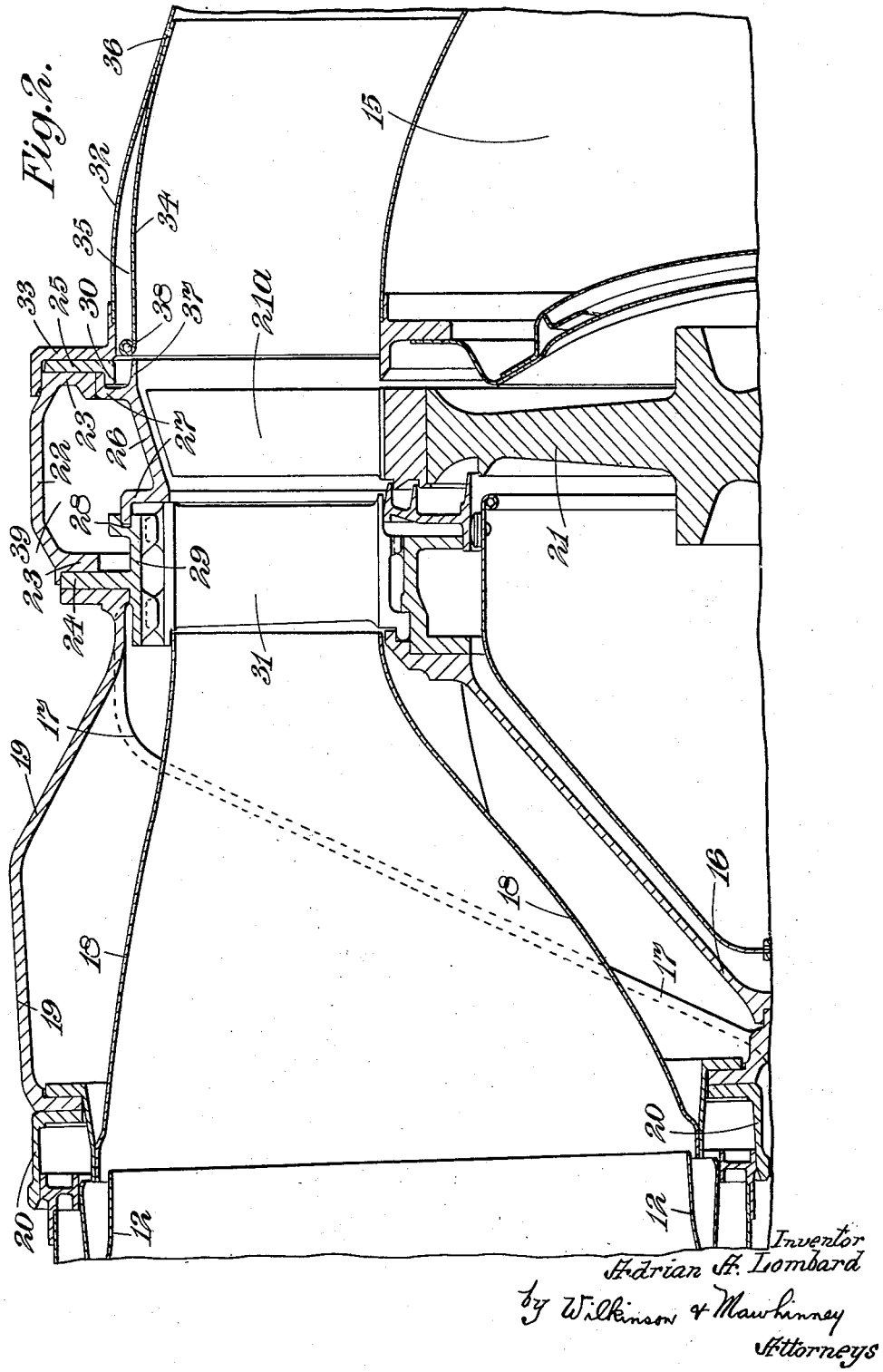

Other features of the invention will be described with reference to a particular embodiment of it illustrated in the accompanying drawings in which Figure 1 is a general view of the gas-turbine-engine, and Figure 2 is a fragmentary sectional view in a plane through the turbine axis.

Referring to Figure 1, the gas-turbine-engine comprises an air-intake 10 opening to a centrifugal compressor 11 which delivers compressed air to a series of combustion-chambers 12 arranged in a ring around a shaft drivingly connecting the compressor to a single stage turbine situated at 13 to which the combustion products pass through a nozzle-box assembly 14 and from which the exhaust gases pass to an exhaust-assembly 15.

The main structure of the gas-turbine-engine is constituted by the compressor-casing, an intermediate casing 16 within the ring of combustion chambers, and an apertured ring 17 extending between the casing 16 at its inner radius, and the turbine stator or nozzle guide vane structure at its outer radius, the apertures in the ring 17 serving for the passage of hot gases from the combustion chambers through necks 19 to the turbine. The necks 19 also enclose the nozzle-boxes 18 which support at their forward ends seating-rings 20 which receive the delivery ends of the combustion chambers 12.

The turbine comprises a turbine-wheel 21 (see Figure 2) carrying blades 21a and a main turbine stator-structure which includes a ring-like member 22 situated in the plane of the turbine-wheel 21. The member 22 constitutes the load-carrying ring aforesaid which provides a point of support S as shown in Figure 1 for the engine on the aircraft, other points of support being indicated at T also in Figure 1. To ensure that the member 22 is not subject to the high temperatures existing within the turbine it is provided on each edge with an inwardly-directed flange 23, to which flanges are bolted rings 24, 25, and an inner stationary shroud-ring 26 is provided lying closely around the outer ends of the turbine-blades 21a being loosely spigoted in or on the rings 24, 25. The shroud-ring 26 is thus located within and spaced radially from the member 22 to form a space 39 thermally insulating the ring 22 from the effects of the high temperatures within the turbine.

The shroud-ring 26 is, in this construction, provided with outwardly-directed peripheral flanges 27 one of which constitutes the male member of a spigot and socket joint the female member of which is formed as an annular groove 28 in a flange 29 on the ring 24, and the other of which forms a spigot and socket joint with a flange 30 on the ring 25. The shroud-ring 26 is formed as a series of segments and the spigot connections between the ring 26 and the rings 24, 25 are preferably a loose fit so as to relieve the shroud-ring from any load stresses, such stresses being transmitted through the ring 22 to the main engine-structure.

The space 39 between the member 22 and the segmental ring 26 may be an enclosure for stagnant gas or means may be provided for supplying a flow of cooling air to it.

The flange 29 on the ring 24 provides in this construction the outer carrier-ring for the nozzle-guide-vanes 31 which are splined thereto. The thermal conduction between guide-vanes 31 and ring 24 is low due to the splined engagement therebetween. The mounting of the nozzle guide-vanes forms no part of this invention but they may conveniently be mounted as described in the specification of United States patent application No. 727,520, now Patent No. 2,605,997. It will be seen moreover that the nozzle-boxes 18 are supported in the supporting ring 17 so that the combustion products do not impinge directly on the ring 17. A similar arrangement of nozzle-boxes is more fully described in the specification of United States patent application No. 733,912.

It will be seen therefore that the nozzle-box assembly, the nozzle-guide-vane assembly and the turbine are so constructed as to isolate the hot gases from the main support-structure of the engine before they reach the turbine; the gases however are still at a high-temperature after leaving the turbine-wheel and it is desirable to provide heat-insulation for the exhaust duct adjacent its connections to the turbine-casing.

For this purpose there is provided at the inlet end of the exhaust duct 32 which is secured to the member 22 by a support-ring 33 welded on the duct, an inner skin 34 spaced away from the duct 32 adjacent the turbine-wheel 21 to provide an insulating air-space 35.

The inner skin 34 in this construction is in the form of a truncated cone whereof the larger diameter is adjacent the turbine-wheel to receive the gases therefrom and the other end is welded to the inner surface of the exhaust duct 32 at a point 36 spaced away from the turbine-wheel and the strength member 22 which is to be protected from excessive heat. The shroud-ring 26 has a rearward extension 37 directed towards the beaded edge 38 of the inner skin 34 to conduct the exhaust gases from the turbine into the interior of the inner skin 34.

I claim:

1. In an axial flow turbine, a turbine rotor, axial-flow rotor blades on said rotor and a turbine stator structure comprising a turbine inlet structure, a mounting ring on said turbine inlet structure, a turbine exhaust structure, a mounting ring on said turbine exhaust structure, a load-carrying ring sandwiched between and secured to said mounting rings and surrounding said rotor blades, said two mounting rings extending radially inwardly from said load-carrying ring and each having an axially-extending flange at its inner diameter, said flanges extending towards each other to define two annular axially-extending recesses, and a substantially continuous stationary shroud ring for said rotor blades located between said load-carrying ring and said rotor blades and spaced from said load-carrying ring to provide a space therebetween in the plane of the rotor blades and radially outwardly of the rotor blades, said shroud ring comprising a plurality of segments each having a pair of oppositely-extending axially-directed flanges thereon, said segments being loosely supported at both ends in circumferential assembly by said axially-directed flanges engaged in said recesses.

2. A construction according to claim 1 further comprising turbine nozzle-guide-vanes in said turbine-inlet structure and wherein said mounting ring on said turbine-inlet structure provides a carrier for said turbine-nozzle guide-vanes.

ADRIAN ALBERT LOMBARD.

REFERENCES CITED

The following references are of record in the file of this patent:

UNITED STATES PATENTS

| Number | Name | Date |
|---|---|---|
| 2,399,046 | Larrecq | Apr. 23, 1946 |
| 2,402,418 | Kroon | June 18, 1946 |
| 2,427,244 | Warner | Sept. 9, 1947 |
| 2,432,359 | Streid | Dec. 9, 1947 |
| 2,452,782 | McLeod | Nov. 2, 1948 |
| 2,472,062 | Boestad et al. | June 7, 1949 |